Patented Jan. 7, 1947

2,413,822

UNITED STATES PATENT OFFICE 2,413,822

PRODUCTION OF KETO ETHERS

Bradford P. Geyer, Berkeley, and Seaver A. Ballard, Oakland, Calif., assignors to Shell Development Company, San Francisco, Calif., a corporation of Delaware No Drawing. Application June 20, 1944, Serial No. 541,284

7 Claims. (Cl. 260—594)

This invention relates to a process for the production of keto ethers and more particularly pertains to a method for the production of keto ethers which comprises reacting an alpha-beta unsaturated ketone with a primary alcohol in the presence of an alkaline earth metal hydroxide.

Several methods have been heretofore employed for the production of keto ethers. These methods have, in general, involved the addition of a primary alcohol to the double bond of an alpha-beta unsaturated ketone using either an acid or a base as a catalyst for the reaction. The addition reaction which takes place may be represented by the equation for the preparation of the methyl ether of diacetone alcohol from methyl alcohol and mesityl oxide:

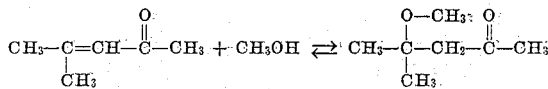

The methods of the prior art for the preparation of keto ethers from primary alcohols and alpha-beta unsaturated ketones have made use of a variety of condensing agents. Thus, the mineral acids, especially sulfuric acid, have been used, the acid being neutralized with a suitable basic material, e. g., lime, at the conclusion of the reaction. Basic substances such as sodium hydroxide, potassium hydroxide, sodium carbonate, potassium carbonate, the sodium alcoholates and the like have also been commonly used as condensing agents. The alkaline earth metal hydroxides have not heretofore been employed in the synthesis, however, nor is it evident or reasonably to be implied from a consideration of the prior art methods that the alkaline earth metal hydroxides, especially calcium hydroxide, have properties such as to make them exceptionally superior condensing agents for effecting the condensation of an alpha-beta unsaturated ketone and a primary alcohol.

It has now been found that the alkaline earth metal hydroxides, i. e., calcium hydroxide, strontium hydroxide and barium hydroxide, are excellent catalysts for the preparation of the ethers of beta keto alcohols by the reaction between an alpha-beta unsaturated ketone, i. e., a ketone containing the structural group

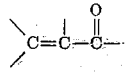

and a primary alcohol. These hydroxides are in fact greatly superior to other basic materials which have been used for the preparation of keto ethers in that their use effects the desired reaction smoothly, with very high yields of product, and with the formation of a minimum amount of tarry by-products. Use of these reagents is also advantageous in that it is economical; a relatively short reaction time is required; and the product is easily isolated from the reaction mixture. The chief advantage attendant upon the use of the alkaline earth metal hydroxides, however, stems from the fact of their relative insolubility in the other constituents of the reaction mixture; i. e., the alpha-beta unsaturated ketone and the primary alcohol. Since the hydroxides are thus relatively insoluble, they may be readily and almost completely separated from the reaction mixture by mechanical methods such as filtration, centrifuging, settling, etc. The small amount of basic substance remaining in solution may then be effectively neutralized by the addition of a small amount of a weak acid to the reaction mixture before isolation of the keto ether product. Inasmuch as but a small amount of acid is needed to neutralize the basic content of the reaction mixture, there is formed but a small quantity of inorganic salts as a product of the neutralization step. This is of importance, since the presence of large amounts of salts in the reaction mixture tends to complicate the procedure for isolating the keto-ether, particularly the distillation step. The fact that a weak acid, such as a weak organic acid, may be used to neutralize the weakly basic condensing agent is likewise an advantage, since use of a strong acid often results in overheating of the reaction mixture, due to the highly exothermic nature of the neutralization reaction, and in the formation of undesirable by-products, such as ketone decomposition products. Use of the relatively insoluble, weakly basic condensing agents of the invention therefore represents a distinct advantage over the use of the strongly basic, soluble alkaline condensing agents of the prior art, which required the use of large quantities of relatively strong acids, e. g., strong mineral acids, as neutralizing agents with consequent complications such as the formation of decomposition products and the introduction into the reaction mixture of relatively large amounts of undesirable salts. The use of relatively insoluble condensing agents in accordance with the process of the invention also makes possible the execution of the process in a continuous manner, which was not possible in the case of the prior art methods, with attendant economic advantage as is fully described hereinbelow.

The process of the invention essentially comprises reacting an alpha-beta unsaturated ketone with a primary alcohol in the presence of a condensing agent consisting of or comprising an alkaline earth metal hydroxide. The reaction may be executed in either a batch or a continuous manner. When carrying out the process in a batch manner the desired quantities of the alpha-beta unsaturated ketone and primary alcohol may be contacted at a reaction temperature with a suitable amount of an alkaline earth metal hydroxide, preferably calcium hydroxide, contained in a suitable reaction vessel. When the reaction is complete the keto ether product may be separated from the reaction mixture by any suitable method, as by fractional distillation. The process of the invention is preferably executed by reacting an alpha-beta unsaturated ketone with a primary alcohol in the presence of a condensing agent comprising calcium hydroxide, removing the said condensing agent from the reaction mixture, adding an acid to the said reaction mixture until a pH of about 7 is established, and separating the desired keto ether from the neutralized reaction mixture. In a specific embodiment whereby the methyl ether of diacetone alcohol is prepared from mesityl oxide using a batch procedure, an excess of methyl alcohol on a molar basis may be reacted with mesityl oxide in the presence of calcium hydroxide for a reaction period of between about two hours and about ten hours. The reaction temperature may be maintained during this time at a level which approximates the boiling temperature of methyl alcohol, i. e., a temperature of between about 55° C. and about 64° C. At the conclusion of the reaction period the reaction mixture may be cooled to reduce the solubility of the calcium hydroxide therein, and the calcium hydroxide removed by any suitable means, as by filtration, centrifuging, settling, etc. The catalyst-free reaction mixture may then be reacted with a sufficient amount of an acid, preferably a weak organic acid, to neutralize any alkaline material which may remain and to thereby establish a pH of approximately 7. The reaction mixture may then be distilled to remove any unreacted methanol and mesityl oxide and to isolate the desired diacetone alcohol methyl ether in a substantially pure form.

When operating in a continuous manner a mixture comprising an alpha-beta unsaturated ketone and a primary alcohol may be continuously contacted at a reaction temperature with a catalyst comprising the hydroxide of an alkaline earth metal, the reaction product may be continuously withdrawn from the reaction chamber, the desired keto ether may be continuously separated from any unreacted starting materials, and the said unreacted starting materials continuously recycled into contact with the same or a further quantity of alkaline earth metal hydroxide catalyst.

Stated in greater detail the presently disclosed continuous process for the preparation of keto ethers comprises continuously introducing a quantity of an alpha-beta unsaturated ketone and a primary alcohol into a suitable reaction chamber maintained at a reaction temperature and containing a quantity of an alkaline earth metal hydroxide, preferably calcium hydroxide, continuously withdrawing the reaction product from the said reaction chamber, adding a sufficient amount of an acid to the said reaction product to neutralize any alkaline material which may be present therein and establish a pH of approximately 7, continuously separating the keto ether from the unreacted starting materials by any suitable method, as by fractional distillation, and continuously recycling the said unreacted starting materials into contact with the same or a further amount of alkaline earth metal hydroxide.

A preferred embodiment which illustrates the presently disclosed continuous process for the preparation of keto ethers is represented by that which may be advantageously employed in the synthesis of the methyl ether of diacetone alcohol from mesityl oxide and methanol. In this embodiment a mixture comprising methanol and mesityl oxide may be continuously contacted with a quantity of solid calcium hydroxide contained in a reaction chamber which is maintained at a temperature of between about 55° C. and about 64° C., and continuously withdrawing from the said reaction chamber the reaction product which comprises an equilibrium mixture of diacetone alcohol methyl ether and unreacted starting materials, i. e. mesityl oxide and methanol, together with a small amount of calcium hydroxide catalyst which has been carried down from the reaction chamber as a solution or suspension. This small amount of basic material may be neutralized and a pH of approximately 7 established in the said reaction mixture by contacting the said reaction product with an acidic material, preferably a weak organic acid such as tartaric acid. The neutralized reaction product may then be distilled, thereby separating the desired diacetone alcohol methyl ether from the mesityl oxide and methanol, which may be recycled into the catalyst chamber in order to effect their conversion into a further quantity of keto ether.

The process of the invention is not limited, however, to the preparation of the methyl ether of diacetone alcohol from mesityl oxide and methyl alcohol. It may be applied with suitable modifications to the synthesis of keto ethers from many of the lower aliphatic alcohols and alpha-beta unsaturated ketones. Suitable alcohols comprise the saturated and unsaturated lower aliphatic primary alcohols, preferably those having not more than about five carbon atoms. Representative unsaturated alcohols which may be employed in the synthesis include allyl alcohol, methallyl alcohol, crotyl alcohol, isocrotyl alcohol, and the like, while suitable saturated primary alcohols are the saturated primary alcohols having less than about six carbon atoms and including methyl alcohol, ethyl alcohol, n-propyl alcohol, n-butyl alcohol, isobutyl alcohol, n-amyl alcohol, etc. These alcohols may be substituted with suitable substituent groups if desired, suitable substituent groups being those groups which are substantially inert and non-reactive under the reaction conditions and which therefore do not complicate the reaction by causing undesirable side reactions. Examples of suitable substituent groups are the ether group, the phenyl group, a second hydroxyl group and the like. Thus, the reaction may be adapted to the formation of keto ethers by the reaction of benzyl alcohol, ethylene glycol, methyl cellosolve, ethyl cellosolve, etc., with an alpha-beta unsaturated ketone.

As stated, the process of the invention may be employed to prepare keto ethers by the addition of a primary alcohol to an alpha-beta unsaturated ketone, i. e., a ketone wherein the keto group is in alpha-beta relationship to the carbon-carbon double bond, or, stated otherwise, the carbon atom of the carbonyl group is adjacent to a carbon atom which is connected by a double bond to another carbon atom. Such unsaturated ketones contain the structural grouping

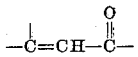

Representative ketones which may be employed in the synthesis include, therefore:

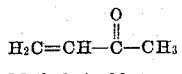
Methyl vinyl ketone

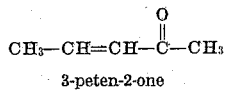
3-peten-2-one

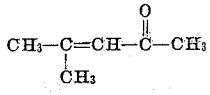
Mesityl oxide

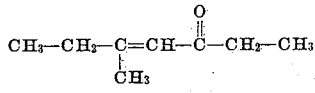
Homomesityl oxide

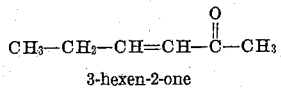
3-hexen-2-one

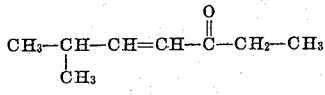
2-methyl-3-hepten-5-one and the like. Mesityl oxide is a preferred member of this group because of its availability on a commercial scale and because of the comparative ease with which it will react with primary alcohols in the presence of an alkaline earth metal hydroxide.

Any of the alkaline earth metal hydroxides, i. e., calcium hydroxide, strontium hydroxide and barium hydroxide, may be used to effect the condensation of a primary alcohol with an alpha-beta unsaturated ketone in accordance with the presently disclosed process. Calcium hydroxide is the preferred member of this group because of its activity as a catalyst for the reaction, because it is substantially insoluble in the reaction medium, and because it is easily procurable and of low cost. These hydroxides may be used individually, in combination with each other, or in admixture with neutral or promoting substances. They may be used in any form which is suitable for use under the reaction conditions employed as, for example, in powder, flake, or pellet form. If desired, they may be introduced into the reaction mixture in the form of compounds which will react to produce the desired alkaline earth metal hydroxides. For example, calcium hydroxide might be formed in situ in the reaction mixture by introducing therein a quantity of calcium oxide together with an amount of water which is approximately sufficient to react therewith and form calcium hydroxide. Similarly a calcium, strontium or barium salt of a weak acid may be introduced together with a sufficient amount of water to effect the hydrolysis of the said salt and form an effective amount of alkaline earth metal hydroxide.

When alpha-beta unsaturated ketones of relatively low molecular weight, i. e. ketones containing up to about 8 carbon atoms, are employed in the synthesis, it is not usually necessary to add to the reaction mixture any substance other than the primary alcohol and the alkaline earth metal hydroxide. However, if desired, in these cases and especially in the case of ketones of higher molecular weight which because of their viscous nature may be difficult to handle, it may be desirable or necessary to add an inert diluent material to the reaction mixture in order to obtain a mixture of suitable properties for use in the synthesis. Suitable diluent or solvent materials are those which are inert and do not result in the occurrence of complicating side reactions. Such suitable solvents include, for example, dioxan, the aliphatic ethers, the hydrocarbon solvents, particularly the aromatic hydrocarbon solvents, etc.

The relative amounts of reactants used may be varied as required in the case of any given preparation. However, since the reaction which takes place results in the establishment of an equilibrium between the starting materials and the keto ether product, it is usually desirable to have present an excess of one of the starting materials in order to shift the equlibrium and form relatively high yields of keto ether. Although either the unsaturated ketone or the alcohol may be used in excess, it is usually preferred to employ an excess of the alcohol since it is ordinarily less expensive and more readily available than is the unsaturated ketone. Although any practical amount of one starting material, e. g., the alcohol, may be used in excess of that theoretically required to react with the alpha-beta unsaturated ketone, it is usually sufficient to have present in the reaction mixture from about six to about ten molar equivalents of alcohol for each molar equivalent of ketone. It is only necessary in batch operation to use sufficient alkaline earth metal hydroxide, e. g., calcium hydroxide, to establish and maintain a solution which is saturated with respect to the alkaline earth metal hydroxide condensing agent. When operating in a continuous manner by continuously contacting a mixture of ketone and primary alcohol with a quantity of solid alkaline earth metal hydroxide, it is necessary to use sufficient alkaline earth metal hydroxide, e. g., calcium hydroxide, to make possible the necessary contact time between the reactants and the catalyst and also to provide for the mechanical loss of small amounts of alkaline earth metal hydroxide as well as losses caused by reason of its slight solubility in the reaction mixture which is withdrawn from the catalyst chamber. Although, as stated, in batch operation the relative amounts of reactants may be variable depending upon the nature of the reactants used and the operating conditions, a ratio of about 2½ parts by weight of alcohol to about 1 part by weight of unsaturated ketone may be employed to advantage in the production of diacetone alcohol methyl ether from methyl alcohol and mesityl oxide.

In batch operation the reaction time should be sufficient to allow full establishment of the equilibrium with resultant maximum yield of keto ether product. The time required to reach equilibrium is variable depending upon the nature of the reactants, and the operating conditions, particularly the temperature. In most cases, however, a reaction time of between about four hours and about eight hours, preferably about six hours, is sufficient. This relatively short reaction period compares favorably with reaction times of one to two days required by the methods of the prior art. When carrying out the process as a continuous process the reaction time or contact time should be sufficient to effect the conversion of a substantial amount of the reacting materials to keto ether. If the conversion per pass is low, this factor may be compensated for by continuously separating the product from the unreacted starting materials and recycling the latter into further contact with a quantity of alkaline earth metal hydroxide catalyst.

The temperature at which the reactants are maintained during the reaction period should be sufficiently high to effect the conversion of a substantial amount of starting materials to product within a reasonable reaction time. When effecting the addition of methyl alcohol to an alpha-beta unsaturated ketone at atmospheric pressure, the temperature employed should be between about 50° C. and about 64° C., preferably about 60° C. It is possible, however, to use higher operating temperatures when carrying out the condensation process under superatmospheric pressures.

The temperature to be used during the cooling of the reaction mixture prior to separation of the alkaline earth metal hydroxide catalyst therefrom should be sufficiently low to reduce the solubility of the alkaline earth metal hydroxide to a point where it is substantially insoluble but above that temperature at which the liquid constituents of the reaction mixture become viscous or solid. In most cases a temperature of between about 0° C. and about 10° C. is adequate.

Although the reaction may usually be satisfactorily carried out at atmospheric pressure, subatmospheric pressures or superatmospheric pressures may be employed in a given case if desirable or necessary. It may be desirable, for example, to use superatmospheric pressures when using a low-boiling alcohol or one which does not react rapidly with the alpha-beta unsaturated ketone, since, as indicated hereinabove, use of such elevated pressure enables operation at higher temperatures with consequent reduction of the time requisite for the establishment of the equilibrium.

When reacting individual quantities of an unsaturated ketone with a primary alcohol, it is usually desirable or necessary in order to insure intimate contact of the reactants with the catalyst to secure a thorough agitation of the reaction mixture. This may be secured, for example, by stirring or shaking the reaction mixture or passing a stream of an inert gas therethrough. In continuous operation since a stream of the reacting materials is continuously percolated through or otherwise contacted with a quantity of the catalyst, it is usually not necessary to resort to other means of obtaining the necessary intimate contact.

It is usually preferred to execute the process of the invention by contacting the starting materials in the liquid phase with a quantity of a condensing agent comprising a hydroxide of an alkaline earth metal. In some cases, however, it may be advantageous to operate in the vapor phase, as by continuously contacting a stream of primary alcohol and unsaturated ketone with a quantity of catalyst at a temperature which is above the vaporization temperature of the said primary alcohol and unsaturated ketone. This may result in a given case in making possible higher reaction rates and lower contact periods.

When the reaction is complete the reaction product may be subjected to any suitable procedure in order to separate the keto ether in a pure state from any unreacted starting materials and any undesirable by-products which may be present. Since, as indicated hereinabove, the reaction is an equilibrium reaction, it is usually desirable to substantially completely remove any condensing agent, i. e., the alkaline earth metal hydroxide, which may be present in the reaction product before distilling or otherwise treating the said reaction product in order to separate the keto ether therefrom. When operating in a batch manner, this may be accomplished, for example, by chilling the reaction product to a temperature at which the alkaline earth metal hydroxide is substantially insoluble, filtering the said cooled reaction product to remove the said hydroxide and then adding a sufficient amount of an acidic material to neutralize any hydroxide which may still be present and establish a pH of approximately 7. The neutralized reaction product may then be filtered to remove any insoluble matter and distilled or otherwise treated and the desired keto ether separated in a pure form without danger of reversal of the equilibrium to form additional amounts of starting materials. When carrying out the process as a continuous process by continuously contacting a stream of a primary alcohol and an alpha-beta unsaturated ketone with a quantity of an alkaline earth metal hydroxide contained in a suitable reaction chamber and continuously withdrawing the reaction product therefrom, the said reaction product usually contains but a relatively small amount, usually a mere trace, of the condensing agent, which may be dissolved in and/or suspended in the liquids comprising the said reaction product. This liquid may be cooled and filtered if necessary in order to remove at least part of the said condensing agent. Usually, however, it suffices to neutralize the thus entrained or dissolved alkaline earth metal hydroxide in the presence of the other constituents of the reaction product by the addition of an amount of an acid or acid substance which is approximately sufficient to react with the said basic substances and form a reaction product having a pH of about 7. The said reaction product may then be filtered from any insoluble material and distilled to separate the keto ether product from the unreacted primary alcohol and unsaturated ketone, which latter may be cycled back into contact with the same or a further amount of alkaline earth metal hydroxide catalyst.

Any acid or acid substance may be used for the hereinabove-described neutralization step which will react with the alkaline earth metal hydroxide, e. g. calcium hydroxide, and form a neutral solution without causing the occurrence of undesirable side reactions such as, for example, substitution, e. g., sulfonation, polymer formation or oxidation. Suitable acidic substances comprise many of the mineral acids and organic acids and salts of the same which have an acid reaction. Suitable acids are, for example, hydrochloric acid, phosphoric acid, phosphorous acid, acetic acid, propionic acid, butyric acid, citric acid, tartaric acid, oxalic acid, maleic acid, and the like. It is preferred in most cases to effect the neutralization through the agency of a relatively weak organic acid such as tartaric acid, citric acid, oxalic acid, maleic acid, and the like. The neutralization process may be carried out in any suitable manner. It may, for example, be effected by the direct titration of the hydroxide-containing reaction product with an acid or a solution of an acid in an appropriate solvent, using as an indicator a substance which undergoes a color change at a pH of approximately 7. In large scale operation, however, it may be preferable to withdraw a sample of the reaction product, determine its basicity and add the calculated amount of acid material to neutralize the basic content of the total reaction product.

The keto ether product may be isolated from the neutralized reaction product by fractionally distilling the same after filtration, whereupon the relatively low-boiling primary alcohol and unsaturated ketone distill over first, followed by the desired keto ether and leaving as still bottoms a small amount of higher boiling resinous substances.

The process of the invention may be illustrated by the following examples wherein the amounts of the reacting substances and of the products are given in parts by weight.

*Example I*

A well stirred mixture comprising about 2.5 parts of methyl alcohol and 1 part of mesityl oxide was heated in the presence of about 0.1 part of calcium hydroxide for about six hours at a temperature of about 60° C. The reaction product was then cooled to about 5° C. and the cooled mixture filtered to remove the calcium hydroxide. It was then neutralized with an alcoholic solution of tartaric acid. The unreacted methanol was next removed by distillation of the product at atmospheric pressure. The pressure was then reduced to about 20 mm. and the distillation continued to effect the separation of the unreacted mesityl oxide and the diacetone alcohol methyl ether from a small amount, i. e. about one percent, of resinous material. The yield of diacetone alcohol methyl ether based upon the amount of ketone which had reacted was better than 95%.

*Example II*

The ethyl ether of diacetone alcohol may be prepared by contacting a mixture comprising an excess of ethyl alcohol and mesityl oxide with barium hydroxide at a temperature of between about 60° C. and about 78° C., using substantially the same procedure as outlined in Example I for effecting the reaction and separating the product from the reaction mixture.

*Example III*

3-methoxy-3-methyl-5-heptanone is prepared by continuously passing a mixture comprising homomesityl oxide

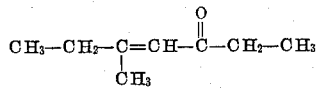

and an excess of methyl alcohol through a quantity of strontium hydroxide contained in a suitable reaction vessel and maintained at a temperature of about 60° C. The reaction product comprising the desired ketone methyl ether and unreacted homomesityl oxide and methyl alcohol may be continuously withdrawn from the reaction chamber, neutralized with an organic acid, and distilled to isolate the keto ether, the unreacted homomesityl oxide and methyl alcohol being recycled into the reaction chamber.

The process of the invention thus affords a practical and economical procedure which may be advantageously applied to the preparation of a variety of keto ethers. The process is characterized by the formation of the desired keto ethers in very high yields, i. e., yields of 95% or better, and by the concurrent production of but very small amounts of resinous by-products. The reaction time is substantially reduced over the reaction time required by the prior art methods. Thus, a batch operation by the presently disclosed method requires a reaction time of but about four to six hours as compared with a reaction time of as high as several days required by previously known procedures. The process is economical in that it uses but a small amount of catalyst material, the major portion being recovered and available for use in converting a further quantity of starting materials to keto ether products. The procedure leads to the formation of a very pure product and is easy to carry out since the catalytic material may be readily removed from the reaction product by simple filtration, centrifuging or settling, whereas the prior art methods require neutralization of a relatively large amount of acidic or basic condensing agent with resultant complications stemming from the use of a strongly acidic neutralizing agent and necessity of separating the product from the large quantities of salts formed by the neutralization process. A primary advantage of the present invention is, however, the fact that use of the herein-described relatively insoluble alkaline earth metal hydroxides as catalysts makes possible the continuous production of keto ethers by the reaction of a primary alcohol with an unsaturated ketone. By use of such a continuous process it is possible to prepare keto ethers in high yields in relatively short operating time and with very high over-all conversions of starting materials to keto ether product.

We claim as our invention:

1. A method for the production of diacetone alcohol methyl ether which comprises continuously contacting a mixture comprising methanol and mesityl oxide with solid calcium hydroxide contained in a reaction chamber maintained at a temperature of between about 50° C. and about 65° C., continuously withdrawing the reaction product from the said reaction chamber, continuously reacting the said product with a sufficient amount of an organic acid to effect the substantial neutralization of the basic content thereof, continuously separating the diacetone alcohol methyl ether product from the unreacted starting materials by distilling the said product, and continuously cycling the said unreacted starting materials back into contact with the solid calcium hydroxide contained in the said reaction chamber.

2. A process for the production of the methyl ether of diacetone alcohol which comprises reacting mesityl oxide with methyl alcohol at a temperature of about 60° C. and in the presence of solid calcium hydroxide, removing the said solid calcium hydroxide from the reaction mixture, adding a sufficient amount of an acid to the said reaction mixture to result in the establishment therein of a pH of about 7, and distilling the neutralized reaction mixture to separate the diacetone alcohol methyl ether therefrom.

3. A process for the preparation of diacetone alcohol ethers which comprises continuously contacting a mixture comprising an aliphatic primary alcohol having less than six carbon atoms and mesityl oxide with a catalyst comprising calcium hydroxide contained in a reaction chamber which is maintained at a reaction temperature, continuously withdrawing from the said reaction chamber a reaction mixture comprising the desired diacetone alcohol ether and unreacted aliphatic alcohol and mesityl oxide, together with a small amount of calcium hydroxide, continuously neutralizing the calcium hydroxide content of the said reaction mixture by the reaction thereof with an acid, continuously separating the diacetone alcohol ether from the unreacted starting materials, and continuously recycling the latter to the reaction chamber.

4. A process for the production of the ether derivatives of diacetone alcohol which comprises reacting mesityl oxide with an aliphatic primary alcohol of less than six carbon atoms in the presence of a catalyst comprising calcium hydroxide.

5. A process for the production of the ethers of diacetone alcohol which comprises reacting mesityl oxide with a lower aliphatic primary alcohol of not more than five carbon atoms in the presence of an alkaline earth metal hydroxide.

6. A method for the production of diacetone alcohol ethers which comprises continuously contacting a mixture comprising an aliphatic primary alcohol of less than six carbon atoms and mesityl oxide with solid calcium hydroxide contained in a reaction chamber maintained at a temperature of between about 50° C. and about 65° C., continuously withdrawing the reaction product from said reaction chamber, continuously reacting said product with a sufficient amount of an organic acid to effect the substantial neutralization of the basic content thereof, continuously separating the diacetone alcohol ether from the unreacted starting materials by distilling said product, and continuously cycling said unreacted starting materials back into contact with the solid calcium hydroxide contained in the reaction chamber.

7. A method for the production of diacetone alcohol methyl ether which comprises continuously contacting a mixture comprising methanol and mesityl oxide with an alkaline earth metal hydroxide contained in a reaction chamber maintained at a temperature of between about 50° C. and about 65° C., continuously withdrawing the reaction product from said reaction chamber, continuously reacting said product with a sufficient amount of an organic acid to effect the substantial neutralization of the basic content thereof, continuously separating the diacetone alcohol methyl ether product from the unreacted starting materials by distilling said product, and continuously cycling said unreacted starting materials back into contact with the alkaline earth metal hydroxide contained in said reaction chamber.

BRADFORD P. GEYER.
SEAVER A. BALLARD.